(12) United States Patent  (10) Patent No.: US 7,405,837 B2
Tsuchiya  (45) Date of Patent: Jul. 29, 2008

(54) IMAGE TRANSMISSION DEVICE AND INFORMING METHOD THEREOF

(75) Inventor: Hiroteru Tsuchiya, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1276 days.

(21) Appl. No.: 10/077,891

(22) Filed: Feb. 20, 2002

(65) Prior Publication Data
US 2002/0114016 A1 Aug. 22, 2002

(30) Foreign Application Priority Data
Feb. 20, 2001 (JP) ............... 2001-043825

(51) Int. Cl.
*H04N 1/327* (2006.01)
*H04N 1/32* (2006.01)
(52) U.S. Cl. ..................... 358/1.15; 358/468
(58) Field of Classification Search ............... 358/1.15, 358/1.9, 2.1, 402, 468; 709/204–207
See application file for complete search history.

(56) References Cited
U.S. PATENT DOCUMENTS
6,687,742 B1 * 2/2004 Iwazaki ............... 709/206
6,831,757 B1 * 12/2004 Terao ............... 358/400
6,836,789 B1 * 12/2004 Toyoda ............... 709/206

FOREIGN PATENT DOCUMENTS
EP 1139645 A2 * 10/2001
JP 10-293733 11/1998
JP 2003169183 A * 6/2003

OTHER PUBLICATIONS
U.S. Appl. No. 10/051,540, filed Jan. 22, 2002, Toshiba Tec Kabushiki Kaisha.

* cited by examiner

*Primary Examiner*—Thomas D. Lee
*Assistant Examiner*—Stephen Brinich
(74) *Attorney, Agent, or Firm*—Foley & Lardner LLP

(57) ABSTRACT

A CPU checks a relation between the terminal type information which is stored in a transmission destination terminal type of an information storing unit in association with a mail address designated as a transmission destination of the image transmission when this image transmission is designated, namely, a terminal type of a transmission destination, and a transmission system of which usage is designated. The CPU informs the confirmation result of the system designation on the basis of the class information which is stored in an information storing unit in association with a mail address, which is designated as a transmission destination.

19 Claims, 5 Drawing Sheets

| Mail address | Terminal type |
|---|---|
| ○○○○○@○○○.co.jp | IFAX |
| ×××××@×××.co.jp | Non-IFAX |
| △△△△△@△△△.co.jp | IFAX |
| ⋮ | ⋮ |

IMAGE TRANSMISSION DEVICE AND INFORMING METHOD THEREOF

CROSS-REFERENCE TO RELATED APPLICATIONS

This application is based upon and claims the benefit of priority from the prior Japanese Patent Application No. 2001-043825, filed Feb. 20, 2001, the entire contents of which are incorporated herein by reference.

BACKGROUND OF THE INVENTION

1. Field of the Invention

The present invention relates to an image transmission device provided with a function for transmitting an image obtained, for example, by reading an original document by a scanner to other internet facsimile terminal via a network in a predetermined internet facsimile system and a function for transmitting an electronic mail attached with the image to an arbitrary terminal such as other computer terminal or the like via a network despite an Internet facsimile system and its informing method thereof.

2. Description of the Related Art

As a method for communicating an image to a remote place, a digital complex machine is popular by the use of a PSTN (Public Switched Telephone Network) and an ISDN (Integrated Services Digital Network). In the first instance, this kind of digital complex machine can be easily operated and secondary, this kind of digital complex machine can inform a message even if a party is absent. Therefore, this kind of digital complex machine is widely distributed not only in a business field but also in a household.

A communication standard of a facsimile by the use of the PSTN and the ISDN is recommended as a standard of a G3 facsimile and a G4 facsimile.

A first advantage of such a conventional facsimile is to enable the data to be transferred at the highest communication speed allowable by a bandwidth of a communication line by securing a communication line with respect to a facsimile directly at a receiving side. A second advantage thereof is to enable to check that the data has been certainly transmitted by directly communicating with a party. Further, a third advantage of such a conventional facsimile is to enable to transmit the data certainly in order to perform a capacity negotiation to check whether a transmission data system is allowable at the receiving side or not.

On the other hand, as the Internet has been generalized, a service to use Internet in place of a conventional circuit exchange network has been popular.

Particularly, when the transmission distance and the data amount are large, it is possible to keep a communication cost lower by transmitting the data via Internet. Therefore, an Internet digital complex machine provided with a function to transmit and receive the image via the Internet in addition to a function owned by a normal digital complex machine has appeared.

This kind of Internet digital complex machine generally transmits the image data as an attached file of the electronic mail through the Internet. Therefore, the image data is transferred without connection. Accordingly, a negotiation performed by the G3 facsimile and the G4 facsimile is not performed and a communication form is taken such that a transmission side unilaterally transmits the image.

As described above, the Internet facsimile transfers the image by the use of the electronic mail. Accordingly, even when a terminal of a transmission destination is not an Internet facsimile terminal, it is possible for a terminal of a computer such as a personal computer or the like to receive the image transfer if this computer terminal has a function to receive the electronic mail.

However, an image file format to be used for the Internet facsimile is not popular for a computer terminal, so that it is difficult for the computer terminal to process the image file format properly.

Therefore, in order to transfer the image to the computer terminal, it is considered that a function to convert the image data into a file format, for example, a PDF (Portable Document Format) or the like, which is standard for the computer terminal, is provided and such a file format for a computer and a file format for the Internet facsimile are selectively used. However, a user should designate which file format should be used, so that this involves a problem such that a normal image communication is not performed if the user's designation of the file format is wrong.

BRIEF SUMMARY OF THE INVENTION

An object of the present invention is to provide an image transmission device with a good usability and its informing method.

According to the embodiment of the invention, on the basis of the class information stored in an information storing unit in association with a mail address which is designated as a transmission destination, the confirmation result of the system designation is informed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

DETAILED DESCRIPTION OF THE INVENTION

Figures 1, 3:
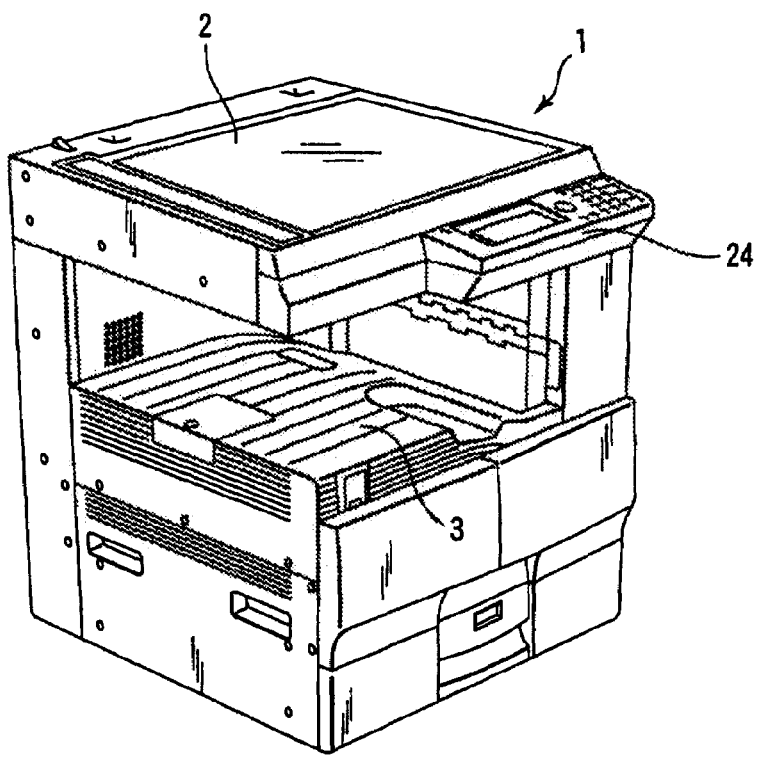
FIG. 1 is a perspective view of a digital complex machine, which is constructed by applying an image transmission device according to an embodiment of the present invention.
FIG. 3 is a view for illustrating an example of the storage data of a transmission destination terminal type storage table which is set in an information storing unit shown in FIG. 2.

Then, an embodiment of the present invention will be described with reference to the drawings below. FIG. 1 is an appearance view of a digital complex machine, which is constructed by applying an image transmission device according to an embodiment of the present invention.

In FIG. 1, a reference numeral 1 is a digital complex machine. A original document mounting table 2 is mounted on an upper surface of this digital complex machine 1. This original document mounting table 2 is composed of a glass and a scanner 17 is provided within it. A reference numeral 3 is a discharge unit, from which a copied paper is discharged, and a reference numeral 24 is an operating/displaying unit. Alternatively, in a steel case located at a lower side of the discharge unit 3, a CPU 11, a printer, . . . or the like are mounted to be described later with reference to FIG. 2.

Figure 2:
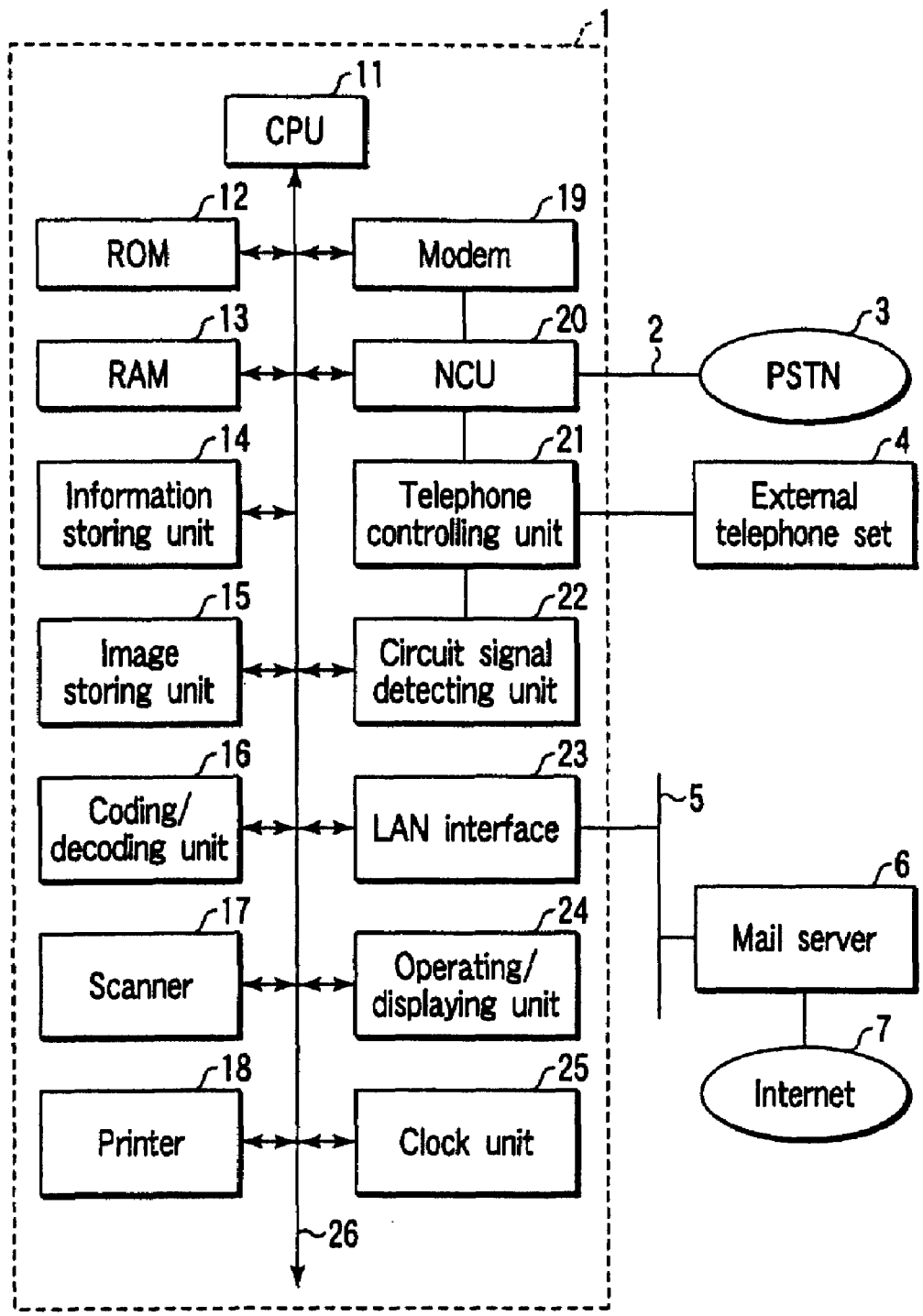
FIG. 2 is a block diagram for illustrating a construction of a substantial part of a digital complex machine, which is constructed by applying an image transmission device according to an embodiment of the present invention.

In the next place, with reference to FIG. 2, a block diagram illustrating a construction of a substantial part of this digital complex machine will be described. The digital complex machine 1 comprises a CPU 11, a ROM 12, a RAM 13, an information storing unit 14, an image storing unit 15, a coding/decoding unit 16, a scanner 17, a printer 18, a modem 19, an NCU 20, an telephone controlling unit 21, a circuit signal detecting unit 22, a LAN interface 23, an operating/displaying unit 24 and a clock unit 25.

Then, the a CPU 11, the ROM 12, the RAM 13, the information storing unit 14, the image storing unit 15, the coding/decoding unit 16, the scanner 17, the printer 18, the modem 19, the NCU 20, the circuit signal detecting unit 22, the LAN interface 23, the operating/displaying unit 24 and the clock unit 25 are connected to each other via a system bus 26. Additionally, the modem 19 and the telephone controlling unit 21 are connected to the NCU 20 and the circuit signal detecting unit 22 each is connected to the telephone controlling unit 21.

The CPU 11 realizes the operation as the digital complex machine by performing the control processing in order to generally control each unit on the basis of the control program which is stored in the ROM 12.

The ROM 12 stores the control program or the like of the CPU 11.

The RAM 13 is used as a work area or the like to store various information necessary for the CPU 11 to perform various processes.

The information storing unit 14 uses, for example, a flash memory or the like and it stores various setting information and other information. A portion of the storage area of this information storing unit 14 is set in a transmission destination terminal type storage table as an address storing means and a class information storing means. As shown in FIG. 3, in addition to an area to store a mail address, an area to store the terminal type information indicating whether a terminal having the mail address is an internet facsimile (IFAX) or other terminal in association with each mail address is set in this transmission destination terminal type storage table.

For example, the image storing unit 15 uses a mass storage DRAM and a mass storage hard disk device or the like and it temporarily stores the received image data and the image data waiting for transmission.

The coding/decoding unit 16 decodes the image data to which is coded for compressing the redundancy as well as performs the coding processing for compressing redundancy with respect to the image data.

The scanner 17 reads a transmitter original document and generates the image data indicating this transmitter original document.

The printer 18 prints out an image indicated by the image data on the recording paper.

The modem 19 generates a facsimile transmission signal by modulating the image data and generates a command transmission signal by modulating a command to be given from the CPU 11. The modem 19 transmits these transmission signals to a PSTN subscriber's line 2 via an NCU 20. Alternatively, the modem 19 demodulates the facsimile transmission data, which arrives via the PSTN subscriber's line 2 and is given via the NCU 20, to reproduce the image data and demodulates the command transmission signal to reproduce a command.

The PSTN subscriber's line 2 contained in the PSTN 3 is connected to the NCU 20. Further, the NCU 20 monitors a condition of this connected PSTN subscriber's line 2 and performs the transmission process of this connected PSTN subscriber's line 2 to a network or the like. Alternatively, the NCU 20 sets a level as well as equalizes a facsimile transmission signal to be transmitted to the PSTN subscriber's line 2.

An external telephone set 4 is connected to the telephone controlling unit 21 according to need. Then, the telephone controlling unit 21 performs a well known control process so that a call can be established by the use of the connected external telephone set 4 through the PSTN subscriber's line 2.

The circuit signal detecting unit 22 receives a signal arriving through the PSTN subscriber's line 2 via the NCU 20 and the telephone controlling unit 21 to detect the arrival of a predetermined signal.

Internet 7 is connected to the LAN interface 23 via a LAN circuit 5 and a mail server 6. Then, the LAN interface 23 transmits the data via the LAN circuit 5 or the Internet 7.

The operating/displaying unit 24 has a key inputting unit for receiving various indicating inputs with respect to the CPU 11 by the user and a display unit for displaying various information to be informed to the user under the control of the CPU 11 or the like.

The clock unit 25 always performs the clock operation and outputs the current time information indicating the current time.

As a control means to be realized by operating the CPU 11 on the basis of a control program stored in the ROM 12, the digital complex machine according to the embodiment has a first transmission means, a second transmission means, a mail receiving means, a class information generating means, a first informing control means and a second informing control means in addition to a well known and popular one in the digital complex machine.

Here, the first transmission means performs the image transmission (hereinafter, referred to as Internet facsimile transmission) according to an Internal facsimile system. That is, this first transmission means converts the image data into an image file in a TIFF (Tagged Image File Format) system in accordance with, for example, an ITU-T (International Telecommunication Union-Telecommunication Sector) which is defined by an Internet facsimile system and further, the first transmission means generates an electronic mail in a predetermined format (i.e., a format defined by the Internet facsimile system) attached with this image file to transmit it. Further, when the user designates the Internet facsimile system as a transmission system, this first transmission means performs the Internet facsimile transmission. Alternatively, this first transmission means has a transmission confirmation mode as a first mode. This transmission confirmation mode adds predetermined information, which requires the transmission destination to return a response of an electronic mail as a transmission confirmation notice defined by the Internet facsimile system, to the electronic mail. Then, the first transmission means decides to use this transmission confirmation mode or not depending on the mode designation by the user. Thus, when this transmission confirmation mode is not used, the transmission destination is not required to return a response of the electronic mail as the transmission confirmation notice and this condition corresponds to a second mode.

The second transmission means performs the image transmission to the computer terminal despite an Internet facsimile system. That is, the second transmission means converts the image data into an image file in a standard file format by the computer terminal and further, the second transmission means generates an electronic mail attached with this image file in an arbitrary format to transmit it. Alternatively, according to the embodiment, it is assumed that this second transmission means uses a PDF format as a file format and the image transmission due to this second transmission means is refereed to as the PDF transmission. Then, this second transmission means performs the PDF transmission when the user designates a non-Internet facsimile system as a transmission system. Alternatively, this second transmission means has the transmission confirmation mode. This second transmission confirmation mode adds the predetermined information, which requires the transmission destination to return a response of an electronic mail as a transmission confirmation notice defined by a general electronic mail protocol which is different from the Internet facsimile system, to the electronic mail. Then, the second transmission means decides to use this transmission confirmation mode or not depending on the mode designation by the user.

The mail receiving means receives the electronic mail, which is arrived via the LAN circuit 5 and is addressed to itself.

In the case that the image file is attached to the received electronic mail, the class information generating means identifies whether the terminal of the transmitter is an Internet facsimile terminal or a computer terminal other than the Internet facsimile terminal on the basis of a file format of this attached image file. Then, the class information generating means stores the terminal type information indicating the identification result in the transmission destination terminal type storage table of the information storing unit 14.

If a mail address designated as a transmission destination is stored in the transmission destination terminal type storage table of the information storing unit 14 when the image transmission is required and further, the terminal type information is stored in association with this mail address, the first informing control means estimates whether the transmission system designated by the user on the basis of this terminal type information is appropriate or not. Then, if it is estimated that the transmission system is not appropriate, the first informing control means makes the operating/displaying unit 24 display a message to prompt the user to check the designation of the transmission system.

The second informing control means makes the operating/displaying unit 24 display a message to prompt the user to check the transmission confirmation mode if the transmission confirmation mode is OFF despite the altered transmission system is the Internet facsimile transmission system or if the transmission confirmation mode is ON despite the altered transmission system is the PDF transmission when the user designates the alternation of the transmission system in accordance with the message displayed under the control of the first informing control means.

In the next place, the operation of a digital complex machine constructed as described above will be explained below. The digital complex machine according to the embodiment has a copying function, a printing function or a G3 facsimile function or the like. However, the operations for realizing these functions are the same as those of the conventional digital complex machine, so that the explanations thereof are herein omitted but the operations of the Internet facsimile function and the function for transmitting the image to the computer terminal will be explained in detail below.

At first, prior to explaining the operation of the actual image transmission, the process for automatically storing the terminal type information in the transmission destination type storing table of the information storing unit 14 upon receiving the electronic mail will be explained.

Figure 4:
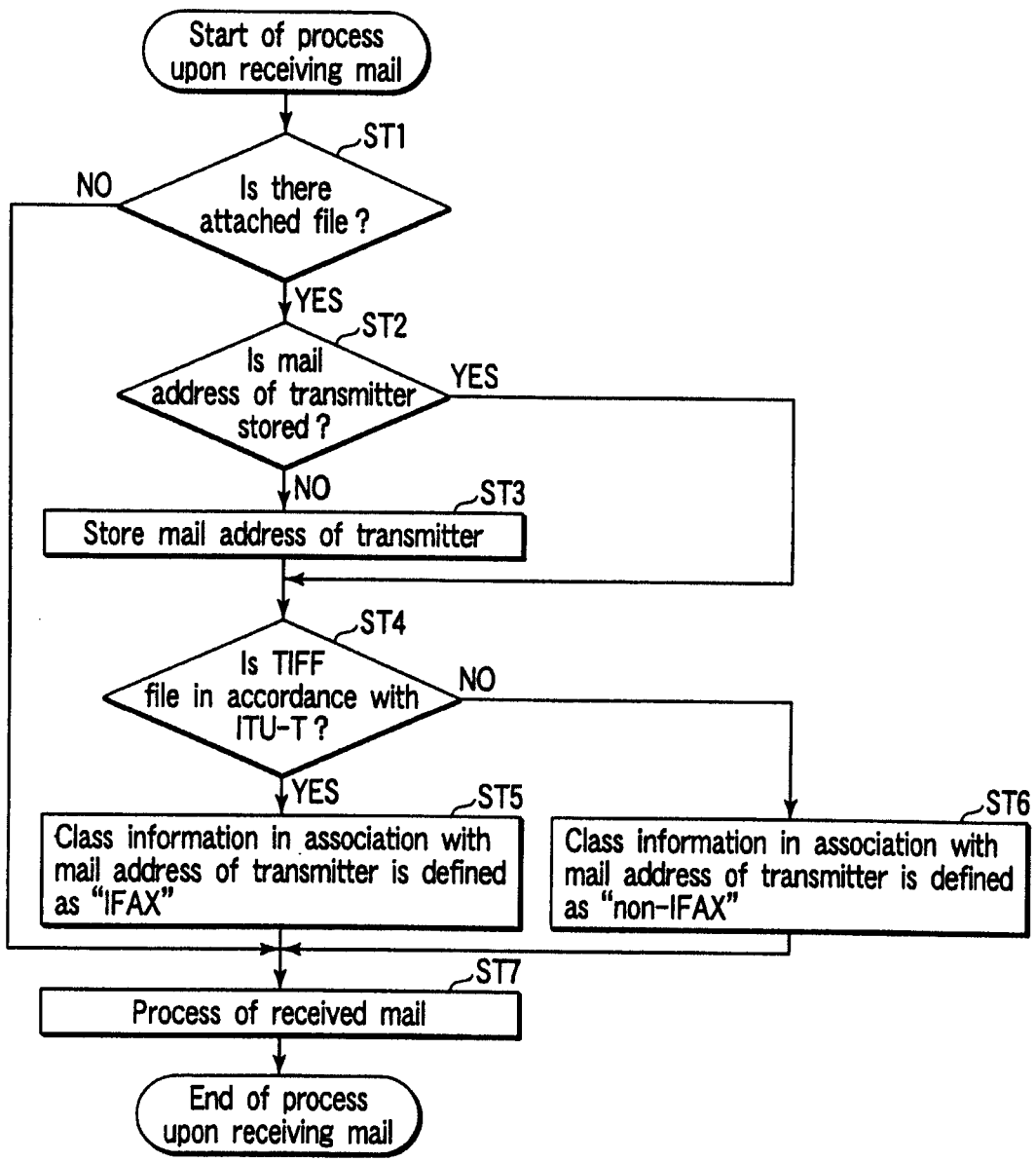
FIG. 4 is a flow chart for showing a processing procedure when performing the process upon receiving the mail by a CPU shown in FIG. 2.

The CPU 11 will perform the process upon receiving the mail as shown in FIG. 4 if the electronic mail addressed to itself arrives via the LAN circuit 5.

In this process upon receiving the mail, the CPU 11 at first checks whether the attached file is attached to the arrived electronic mail or not (step ST1). If the attached file is attached to the arrived electronic mail, the CPU 11 subsequently extracts the mail address of the transmitter from the electronic mail and checks whether this mail address has been already stored in the transmission destination type storing table of the information storing unit 14 (step ST2). Then, if the corresponding mail address is not stored in the transmission destination type storing table of the information storing unit 14, the CPU 11 stores the mail address of the electronic mail of the transmitter, which is received in this time, in the transmission destination type storing table of the information storing unit 14 (step ST3). Alternatively, if the corresponding mail address has been already stored in the transmission destination type storing table of the information storing unit 14, the CPU 11 passes the process at the step ST3.

Subsequently, the CPU 11 checks whether the attached file is a TIFF file in accordance with the ITU-T or not (step ST4). Then, if the attached file is the TIFF file in accordance with the ITU-T, the CPU 11 writes the terminal type information "IFAX" in a storage area of the terminal type information in accordance with a mail address of the transmitter in the transmission destination type storing table of the information storing unit 14 (step ST5). On the contrary, if the attached file is not the TIFF file in accordance with the ITU-T, but the attached file is, for example, a PDF file or a bit map file or a TIFF file not in accordance with the ITU-T such as an image file of which resolution is a DPI (Dot Per Inch) or a file of a particular application soft ware or the like, the CPU 11 writes the terminal type information, i.e., "non-IFAX" in a storage area of the terminal type information in accordance with a mail address of the transmitter in the transmission destination terminal type storage table of the information storing unit 14 (step ST6).

After that, the CPU 11 performs the receiving mail process (step ST7). This receiving mail process serves to perform various processes in accordance with a content of the received electronic mail. For example, if it is in accordance with an Internet facsimile system of the ITU-T, an image is developed from the attached file and the printer 18 prints out the image.

Alternatively, when it is confirmed that the attached file is not attached to the electronic mail, which is received in this time in the step ST1, it is not possible to perform the processes from the step ST2 to the step ST6. Therefore, the CPU 11 passe these processes and shifts to the process in the step ST7 so that it performs the receiving mail process.

Then, if this receiving mail process is terminated, the CPU 11 terminates the mail receiving process in this time.

Figure 5:
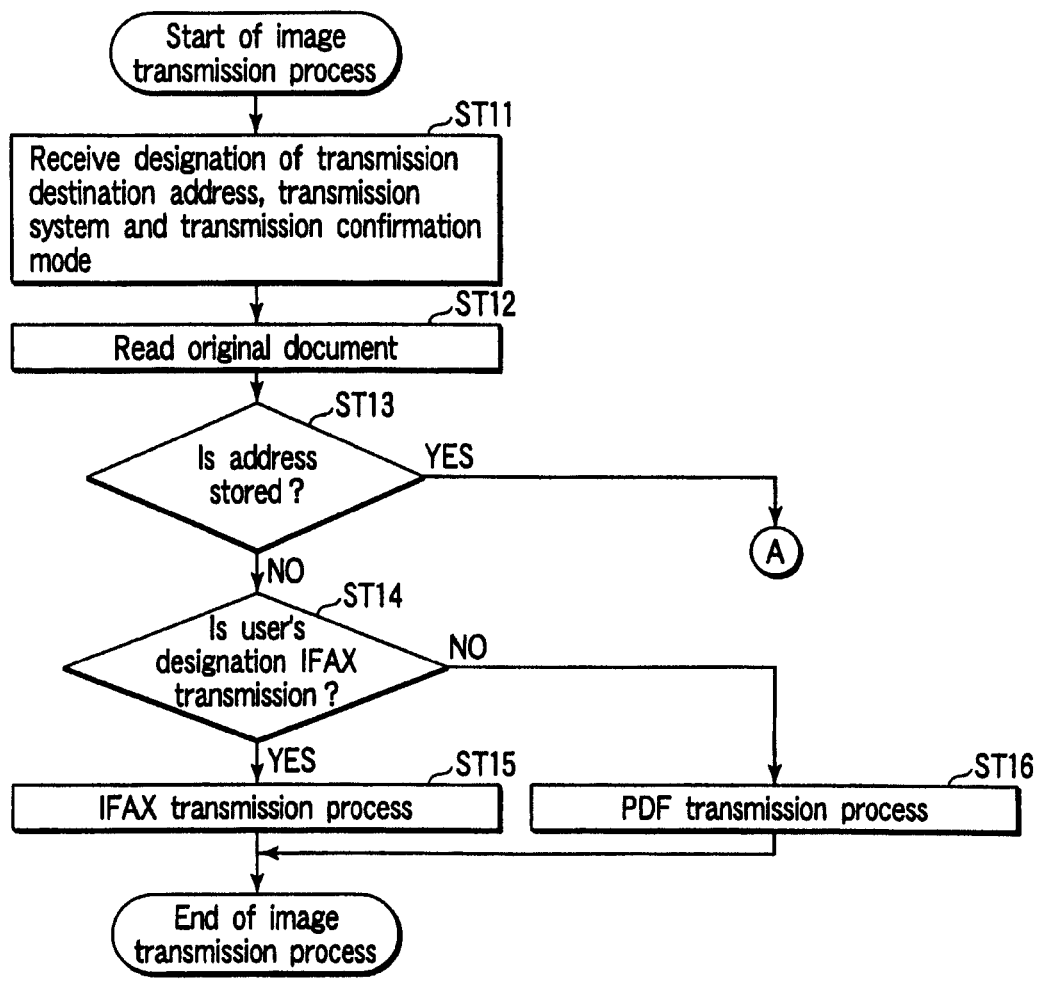
FIG. 5 is a flow chart for showing a processing procedure upon performing the image transmission process by a CPU shown in FIG. 2.
Figure 6:
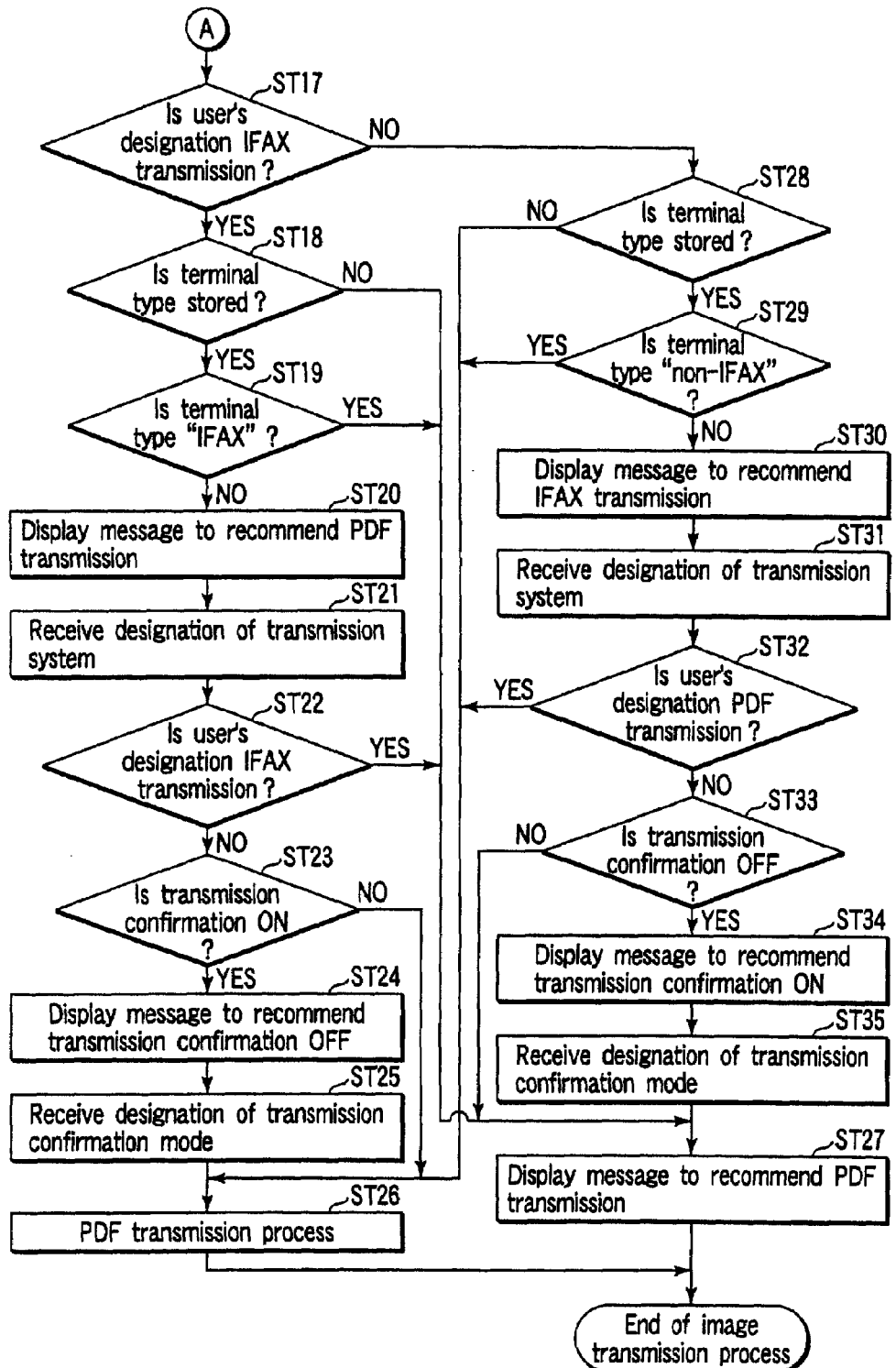
FIG. 6 is a flow chart for showing a processing procedure upon processing the image transmission by a CPU shown in FIG. 2.

If the original document is set on the scanner 17 and the image transmission is indicated via the computer network (a LAN and the Internet 7), the CPU 11 starts the image transmission process as shown in FIGS. 5 and 6.

In this image transmission process, at first, the CPU 11 receives the mail address of the transmission destination, the transmission system and the user designation by the transmission confirmation mode (step ST11 in FIG. 5). Subsequently, the image data to be generated by the scanner 17 is stored in the image storing unit 15.

In the next place, the CPU 11 checks whether the mail address designated in the step ST11 is stored in the transmission destination terminal type storage table of the information storing unit 14 or not (step ST13). Here, if the designated mail address is not stored in the transmission destination terminal type storage table of the information storing unit 14, the CPU 11 checks the user designation in the transmission system (step ST14) and the CPU 11 performs the well known Internet facsimile transmission (IFAX transmission) process or the PDF transmission process (step ST15 or step ST16). If the image transmission is terminated, the CPU 11 terminates the image transmission process in this time.

On the contrary, if it is confirmed that the mail address designated in the step ST11 is stored in the transmission destination terminal type storage table of the information storing unit 14 in the step ST13, the CPU 11 checks whether the Internet facsimile transmission system is designated by the user's designation of the transmission system or not (step ST17 in FIG. 6).

If the Internet facsimile transmission system is designated, the CPU 11 checks whether the terminal type information is stored in the transmission destination terminal type storage table of the information storing unit 14 in association with a mail address designated in the step ST11 or not (step ST18). If the relevant terminal type information is stored, subsequently, the CPU 11 checks whether this terminal type information is "IFAX" or not (step ST19).

In the case that the relevant terminal type information is not "IFAX", namely, when the information of the transmission destination terminal type storage table of the information storing unit 14 indicates that a terminal type of a mail address of the transmission destination is not an Internet facsimile despite the user requires the Internet facsimile transmission, it is possible to estimate that the user's designation of the transmission system is not appropriate. Accordingly, the CPU 11 makes the operating/displaying unit 24 display a certain message having a content for recommending the PDF transmission (step ST20). Then, in this condition, the CPU 11 receives the user's designation of the transmission system again (step ST21) and checks whether the transmission system designated in this time is the Internet facsimile transmission system or not (step ST22).

In the case that the user designates the PDF transmission in this time, namely, when the user alters the transmission system according to the displayed message, the CPU 11 subsequently checks whether ON of the transmission confirmation mode is designated in the step ST11 or not (step ST23). Then, if ON of the transmission confirmation mode is designated, the CPU 11 makes the operating/displaying unit 24 display a certain message having a content for recommending OFF of the transmission confirmation mode (step ST24). Then, in this condition, the CPU 11 receives the user's designation of the transmission confirmation mode again (step ST25) and performs the PDF transmission process in an ON/OFF condition in the transmission confirmation mode designated in this time (step ST26). Alternatively, if it is confirmed that OFF of the transmission confirmation mode is designated in the step S23, the CPU 11 passes the step ST24 and the step ST25 and shifts to the process in the step ST26 so that it performs the PDF transmission process in the ON/OFF condition of the transmission confirmation mode designated in the step ST11.

Then, if this PDF transmission process is completed, the CPU 11 terminates the image transmission process in this time.

On the contrary, when it is confirmed that the terminal type information is not stored in the transmission destination terminal type storage table of the information storing unit 14 in association with the mail address designated in the step ST11 in the step ST18, when it is confirmed that the terminal type information stored in the transmission destination terminal type storage table of the information storing unit 14 in association with the mail address designated in the step ST11 is "IFAX" in the step ST19, and when it is confirmed that the transmission system designated in the step ST21 is the Internet facsimile transmission system in the step ST22, the CPU 11 performs the Internet facsimile transmission process in the ON/OFF condition of the transmission confirmation mode designated in the step ST11 (step ST27). Then, if this Internet facsimile transmission process is completed, the CPU 11 terminates the image transmission process in this time.

The operations when the user designates the Internet facsimile transmission system as a transmission system in the step ST11 are as described above. On the contrary, if the PDF transmission process is designated as a transmission system in the step ST11, the CPU 11 checks whether the terminal type information is stored in the transmission destination terminal type storage table of the information storing unit 14 in association with the mail address designated in the step ST11 or not (step ST28). Then, if the relevant terminal type information is stored therein, the CPU 11 subsequently checks whether this terminal type information is "non-IFAX" or not(step ST29).

If the relevant terminal type information is not "non-IFAX" in this case, namely, when the information of the transmission destination terminal type storage table of the information storing unit 14 indicates that a terminal type of a mail address of the transmission destination is an Internet facsimile despite the user requires the PDF transmission, it is possible to estimate that the user's designation of the transmission system is not appropriate. Accordingly, the CPU 11 makes the operating/displaying unit 24 display a certain message having a content for recommending the Internet facsimile transmission (step ST30). Then, in this condition, the CPU 11 receives the user's designation of the transmission system again (step ST31) and checks whether the transmission system designated in this time is the PDF transmission or not (step ST32).

In the case that the user designates the PDF transmission in this time, namely, when the user alters the transmission system according to the displayed message, the CPU 11 subsequently checks whether OFF of the transmission confirmation mode is designated in the step ST11 or not (step ST33). Then, if OFF of the transmission confirmation mode is designated, the CPU 11 makes the operating/displaying unit 24 display a certain message having a content for recommending ON of the transmission confirmation mode (step ST34). Then, in this condition, the CPU 11 receives the user's designation of the transmission confirmation mode again (step ST35), shifts to the process of the step ST27 and performs the Internet facsimile transmission process in an ON/OFF condition in the transmission confirmation mode designated in the step ST35. Alternatively, if it is confirmed that ON of the transmission confirmation mode is designated in the step S33, the CPU 11 passes the step ST34 and the step ST35 and shifts to the process in the step ST27 so that it performs the Internet facsimile transmission process in the ON/OFF condition of the transmission confirmation mode designated in the step ST11.

On the contrary, when it is confirmed that the terminal type information is not stored in the transmission destination terminal type storage table of the information storing unit 14 in association with the mail address designated in the step ST28 in the step ST18, when it is confirmed that the terminal type information stored in the transmission destination terminal type storage table of the information storing unit 14 in association with the mail address designated in the step ST11 is "non-IFAX" in the step ST29, and when it is confirmed that the transmission system designated in the step ST31 is the PDF transmission system in the step ST32, the CPU 11 shifts to the process of the step ST26 and performs the PDF transmission process in the ON/OFF condition of the transmission confirmation mode designated in the step ST11.

As described above, according to the embodiment, when the transmission system designated by the user is different from the transmission system which is appropriate for a terminal type of a terminal type indicated by the terminal type information stored in the transmission destination terminal type storage table of the information storing unit 14 in association with the mail address designated as a transmission destination, a message is displayed to prompt the user to alter the transmission method. Therefore, if the user designates the transmission system by mistake, the user is capable of knowing this fact, so that it is possible to prevent the useless image transmission in a wrong transmission system by designating an appropriate transmission system again.

Alternatively, according to the embodiment, upon receiving an electronic mail attached with the attached file, a terminal type of a transmitter of the electronic mail is identified on the basis of a file format of this attached file and the terminal type information is automatically stored in the transmission destination terminal type storage table of the information storing unit 14 on the basis of the identified terminal type, so that it is not necessary for the user to check the terminal type of the partner's terminal or to register the terminal type information. As a result, it is very convenient for the user.

Further, according to the embodiment, when ON of the transmission confirmation mode is designated when the user alters the designation of the transmission system from the Internet facsimile transmission to the PDF transmission, or when OFF of the transmission confirmation mode is designated when the user alters the designation of the transmission system from the PDF transmission to the Internet facsimile transmission, a message is displayed so as to prompt to alter the designation of the transmission confirmation mode. The Internet facsimile terminal normally has a function for returning an information mail in response to the transmission confirmation request, so that it is effective to use a transmission confirmation mode. On the contrary, a function for returning an information mail in response to the transmission confirmation request is not generally used in the computer terminal and there is a low probability that the receiving side transmits the information mail even if the transmitting side uses the transmission confirmation mode, so that there may be a possibility that the usage of the transmission confirmation mode only results in complication of the process. On this account, when the user tries to perform the Internet facsimile transmission, the transmission confirmation mode is designated as ON. On the contrary, when the user tries to perform the PDF transmission, there is a high probability that the transmission confirmation mode is designated as OFF. After the Internet facsimile transmission is performed, the transmission confirmation mode remains to be designated as ON and after the PDF transmission is performed, the transmission confirmation mode remains to be designated as OFF.

If the transmission system is only changed from such a condition, a relation between the transmission system and the transmission confirmation mode becomes inappropriate. In such a case, the user is capable of knowing that a relation between the transmission system and the transmission confirmation mode becomes inappropriate, so that it becomes possible to perform the appropriate image transmission by designating a correct transmission confirmation mode condition again.

Alternatively, the present invention is not limited to the above described embodiment. For example, according to the above described embodiment, when the relevant terminal type information is not "IFAX", namely, when the information of the transmission destination terminal type storage table of the information storing unit 14 indicates that a terminal type of a mail address of the transmission destination is not an Internet facsimile despite the user requires the Internet facsimile transmission, the processes from the steps S20 to S22 are performed. However, these processes may be omitted. That is, when a terminal type of a mail address of a transmission destination is not the Internet facsimile even if the user requires the Internet facsimile transmission, it is estimated that the terminal type of the mail address of the transmission destination is a personal computer (PC). Accordingly, when a software capable of reading an image file of a TIFF file is loaded in a PC, there is no problem even if the image file of the TIFF file is transmitted to the PC, so that the information may be not provided.

For example, according to the above described embodiment, the terminal type information is automatically written in the transmission destination terminal type storage table of the information storing unit 14. However, the terminal type information designated by the user may be written therein.

Alternatively, according to the above described embodiment, the informing operation to prompt the user to check the designation of the transmission system and the informing operation to prompt the user to check the designation of the transmission confirmation mode are performed by displaying a message. However, for example, the informing operation may be performed in other manner such as reproducing a voice message or the like. Alternatively, an information command is transmitted to a computer terminal connected via the LAN circuit 5 and the informing operation may be performed at the computer terminal side.

Additionally, according to the above described embodiment, when a mail address which is not stored in the transmission destination terminal type storage table of the information storing unit 14, is a mail address of a transmitter of the received electronic mail, this mail address is stored in the transmission destination terminal type storage table of the information storing unit 14 and further, its terminal type information is stored in association with this mail address. However, the terminal type information may be stored only with respect to a mail address stored in the transmission destination terminal type storage table of the information storing unit 14 in advance, namely, a mail address registered by the user in advance. Hereby, it is possible to prevent a junk mail.

Further, according to the above described embodiment, an example such that the present invention is applied to a digital complex machine is described. However, for example, it is possible to realize the present invention as a device, which is formed otherwise such as a device only having a function to transfer the image.

Alternatively, according to the above described embodiment, an Internet facsimile system defined by the ITU-T is used. However, the present invention can be applied in the case of using other Internet facsimile system such as a system which is uniquely defined, or the like.

Additionally, according to the above described embodiment, it is decided whether the transmission confirmation mode is used or not depending on the user's designation. However, for example, it is also possible that the transmission confirmation mode is automatically used upon the IFAX transmission and the transmission confirmation mode is not used upon the PDF transmission.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image transmission device comprising:
   a first transmitting unit configured to transmit an electronic mail which is attached with an image file in a file format defined by an Internet facsimile system;
   a second transmitting unit configured to transmit an electronic mail which is attached with an image file in a file format different from the file format defined by the Internet facsimile system;
   a selecting unit configured to select the first transmitting unit or the second transmitting unit;
   a class information storing unit to store class information indicating whether a terminal provided in association with a mail address is in accordance with that corresponding to the Internet facsimile system or not; and
   a first informing unit configured to inform a confirmation result about the first transmitting unit or the second transmitting unit, which is selected by the selecting unit on the basis of the class information stored in the class information storing unit in association with the mail address designated as a transmission destination.

2. The image transmission device according to claim 1, wherein the first informing unit is configured to inform the confirmation result of the designation of the transmitting unit which is selected by the selecting unit, when the class information stored in the class information storing unit in association with the mail address designated as a transmission destination indicates that the terminal provided in association with this mail address is in accordance with the Internet facsimile system when the second transmitting unit is selected by the selecting unit.

3. The image transmission device according to claim 1, wherein the first informing unit is configured to inform the confirmation result of the designation of the transmitting unit which is selected by the selecting unit, when the class information stored in the class information storing unit in association with the mail address designated as a transmission destination indicates that the terminal provided in association with this mail address is in accordance with the Internet facsimile system when the second transmitting unit is selected by the selecting unit and when the class information stored in the class information storing unit in association with the mail address designated as a transmission destination indicates that the terminal provided in association with this mail address is not in accordance with the Internet facsimile system when the first transmitting unit is selected by the selecting unit.

4. The image transmission device according to claim 1, wherein the first informing unit is configured not to inform the confirmation result of the designation of the transmitting unit which is selected by the selecting unit, when the class information stored in the class information storing unit in association with the mail address designated as a transmission destination indicates than the terminal provided in association with this mail address is not in accordance with the Internet facsimile system when the first transmitting unit is selected by the selecting unit.

5. The image transmission device according to claim 1, further comprising:
   a mail receiving unit configured to receive an electronic mail; and
   a class information generating unit configured to store the class information in the class information storing unit in association with a mail address of a transmitter on the basis of a file format of an image file which is attached to the electronic mail received by the mail receiving unit.

6. The image transmission device according to claim 5, wherein the class information generating unit is configured to store the class information when the mail address of the transmitter does not exist in the class information storing unit.

7. The image transmission device according to claim 1, wherein the inputted class information is configured to be stored in the class information storing unit.

8. The image transmission device according to claim 5, wherein the class information generating unit is configured to store the class information indicating that a terminal provided in association with a mail address is in accordance with the Internet facsimile system if an image file is attached to an electronic mail received by the mail receiving unit and a file format of the image file attached thereto is defined by the Internet facsimile system, the class information generating unit stores the class information indicating that a terminal provided in association with a mail address is not in accordance with the Internet facsimile system if a file format of the image file attached thereto is different from the file format defined by the Internet facsimile system, respectively, in the class information storing unit in association with the mail address of the transmitter of the electronic mail which is received by the mail receiving unit.

9. The image transmission device according to claim 1, further comprising:
   a mode selecting unit configured to select a first mode which requires a transmission destination terminal to return a response of an electronic mail and a second mode which does not require a transmission destination terminal to return a response of an electronic mail; and
   a second informing unit configured to inform the confirmation result of the designation of the mode when the transmitting unit selected by the selecting unit and a mode selected by the mode selecting unit do not comply with each other.

10. The image transmission device according to claim 9, wherein the second informing unit is configured to prompt the user to check the mode setting when the designation of the mode serves to designate the selection of the second mode despite the designation of the system after alternating the transmitting unit to be selected serves to designate the selection of the first transmitting unit, and when the designation of the mode serves to designate the selection of the first mode despite the designation of the method after alternating the transmitting unit to be selected serves to designate the selection of the second transmitting unit when the alternation of the transmitting unit to be selected depending on the informing operation by the first informing unit is designated by the user.

11. The image transmission device according to claim 1, further comprising:
   a mode selecting unit configured to select a first mode which requires a transmission destination terminal to return a response of an electronic mail and a second mode which does not require a transmission destination terminal to return a response of an electronic mail; and
   a mode setting unit configured to set a first mode when the first transmitting unit is selected by the designation of the system after alternating the transmitting unit to be selected and it sets a second mode when the second transmitting unit is selected by the designation of the system after alternating the transmitting unit to be selected when the alternation of the transmitting unit to be selected depending on the informing operation by the first informing unit is designated by the user.

12. An image transmission device comprising:
   a first transmitting unit configured to transmit an electronic mail which is attached with an image file in a file format defined by an Internet facsimile system;
   a second transmitting unit configured to transmit an electronic mail which is attached with an image file in a file format different from the file format defined by the Internet facsimile system;
   a selecting unit configured to select the first transmitting unit or the second transmitting unit;
   a mode selecting unit configured to select a first mode which requires a transmission destination terminal to return a response of an electronic mail and a second mode which does not require a transmission destination terminal to return a response of an electronic mail;
   a class information storing unit to store class information indicating whether a terminal provided in association with a mail address is in accordance with that corresponding to the Internet facsimile system or not;
   a first informing unit configured to inform a confirmation result of the first transmitting unit or the second transmitting unit, which is selected by the selecting unit on the basis of the class information stored in the class information storing unit in association with the mail address designated as a transmission destination; and
   a second informing unit configured to inform a confirmation result of the designation of the mode when the first or second transmitting unit selected by the selecting unit and a mode selected by the mode selecting unit do not comply with each other.

13. The image transmission device according to claim 12, further comprising:
   a mail receiving unit configured to receive an electronic mail; and
   a class information generating unit configured to store the class information in the class information storing unit in association with a mail address of a transmitter on the basis of a file format of an image file which is attached to the electronic mail received by the mail receiving unit.

14. The image transmission device according to claim 13, wherein the class information generating unit is configured to store the class information when the mail address of the transmission destination of the electronic mail does not exist in the class information storing unit.

15. The image transmission device according to claim 12, wherein inputted class information is configured to be stored in the class information storing unit.

16. An image transmission device comprising:
   first transmitting means for transmitting an electronic mail which is attached with an image file in a file format defined by an Internet facsimile system;
   second transmitting means for transmitting an electronic mail which is attached with an image file in a file format different from the file format defined by the Internet facsimile system;
   selecting means for selecting the first transmitting means or the second transmitting means;
   class information storing means for storing class information indicating whether a terminal provided in association with a mail address is in accordance with that corresponding to the Internet facsimile system or not; and
   first informing means for informing a confirmation result of the first transmitting means or the second transmitting means, which is selected by the selecting means on the basis of the class information stored in the class information storing means in association with the mail address designated as a transmission destination.

17. An informing method of an image transmission device comprising:
   selecting a first transmitting unit configured to transmit an electronic mail which is attached with an image file in a file format defined by an Internet facsimile system or selecting a second transmitting unit configured to transmit an electronic mail which is attached with an image file in a file format different from the file format defined by the Internet facsimile system; and
   informing a confirmation result of designation of the first or second transmitting unit which is selected, when class information stored in a class information storing unit in association with the mail address of a terminal designated as a transmission destination indicates that the terminal is in accordance with that corresponding to the Internet facsimile system when the second transmitting unit is selected.

18. An informing method of an image transmission device comprising:
   selecting a first transmitting unit configured to transmit an electronic mail which is attached with an image file in a file format defined by an Internet facsimile system or selecting a second transmitting unit configured to transmit an electronic mail which is attached with an image file in a file format different from the file format defined by the Internet facsimile system; and
   informing a confirmation result of designation of the first or second transmitting unit which is selected, when the class information the class information stored in a class information storing unit in association with a mail address of a terminal designated as a transmission destination indicates that the terminal is in accordance with that corresponding to the Internet facsimile system when the second transmitting unit is selected and when the class information stored in the class information storing unit in association with the mail address of the terminal designated as a transmission destination indicates that the terminal is not in accordance with that corresponding to Internet facsimile system when the first transmitting unit is selected.

19. A digital complex machine comprising:
   an image reading unit configured to read the image data;
   a first transmitting unit configured to transmit an electronic mail which is attached with an image file in a file format defined by an Internet facsimile system;
   a second transmitting unit configured to transmit an electronic mail which is attached with an image file in a file format different from the file format defined by the Internet facsimile system;
   a selecting unit configured to select the first transmitting unit or the second transmitting unit;

a class information storing unit to store class information indicating whether a terminal provided in association with a mail address is in accordance with that corresponding to the Internet facsimile system or not;

a first informing unit configured to inform a confirmation result of the first or second transmitting unit, which is selected by the selecting unit on the basis of the class information stored in the class information storing unit in association with the mail address designated as a transmission destination; and a printing unit configured to print the confirmation result of the transmitting unit.

* * * * *